United States Patent [19]
Ueno et al.

[11] Patent Number: 5,714,752
[45] Date of Patent: Feb. 3, 1998

[54] IMAGE PICKUP DEVICE IN WHICH THE LIGHT RECEIVING ELEMENT, THE DRIVE CIRCUIT FOR ILLUMINATING MEANS, AND THE DRIVE CIRCUIT FOR THE LIGHT RECEIVING ELEMENT ARE ON THE SAME CHIP

[75] Inventors: Isamu Ueno, Hadano; Mamoru Miyawaki, Isehara, both of Japan

[73] Assignee: Canon Kabushiki Kaisha, Tokyo, Japan

[21] Appl. No.: 252,219

[22] Filed: Jun. 1, 1994

[30] Foreign Application Priority Data

Jun. 3, 1993 [JP] Japan ................................. 5-133432
May 17, 1994 [JP] Japan ................................. 6-102724

[51] Int. Cl.⁶ ........................... H01J 40/14; H01J 77/14
[52] U.S. Cl. ........................ 250/208.1; 250/214.1; 358/475; 358/482
[58] Field of Search ................ 250/214.1, 208.1, 250/561, 216; 358/475, 482; 257/444

[56] References Cited

U.S. PATENT DOCUMENTS

| | | | |
|---|---|---|---|
| 4,461,956 | 7/1984 | Hatanaka et al. | 358/482 |
| 4,517,733 | 5/1985 | Hamano . | |
| 4,574,317 | 3/1986 | Scheible | 358/482 |
| 4,600,843 | 7/1986 | Kizu et al. | 358/482 |
| 4,603,355 | 7/1986 | Yamada et al. . | |
| 4,678,938 | 7/1987 | Nakamura | 250/208.1 |
| 4,791,493 | 12/1988 | Oguru et al. | 358/475 |
| 4,894,699 | 1/1990 | Hayashi et al. . | |
| 5,019,702 | 5/1991 | Ohzu et al. | 250/208.1 |
| 5,027,226 | 6/1991 | Nagata et al. | 358/482 |
| 5,132,541 | 7/1992 | Conrads et al . | |
| 5,162,912 | 11/1992 | Ueno et al. . | |
| 5,268,752 | 12/1993 | Fukada et al. | 358/475 |
| 5,274,244 | 12/1993 | Poujois | 257/244 |
| 5,420,452 | 5/1995 | Tran et al. . | |

FOREIGN PATENT DOCUMENTS 0456451  5/1991  European Pat. Off. .

OTHER PUBLICATIONS

Kaneko et al., "400 dpi Integrated Contact Type Linear Image Sensors with Poly–Si TFT's Analog Readout Circuits and Dynamic Shift Registers," IEEE Transaction on Electron Devices, vol. 38, No. 5, May 1991.

*Primary Examiner*—Stephone Allen
*Attorney, Agent, or Firm*—Fitzpatrick, Cella, Harper & Scinto

[57] ABSTRACT

An image pickup device comprises illuminating means for illuminating an object and an image pickup element for picking up an image of the object. An improvement is in that a drive circuit for driving the illuminating means and a control circuit for controlling the driving of the image pickup device are integrated with the image pickup device into one chip, in order to operate the image pickup device only a single power source and to minimize the device structure.

16 Claims, 13 Drawing Sheets

FIG. 14
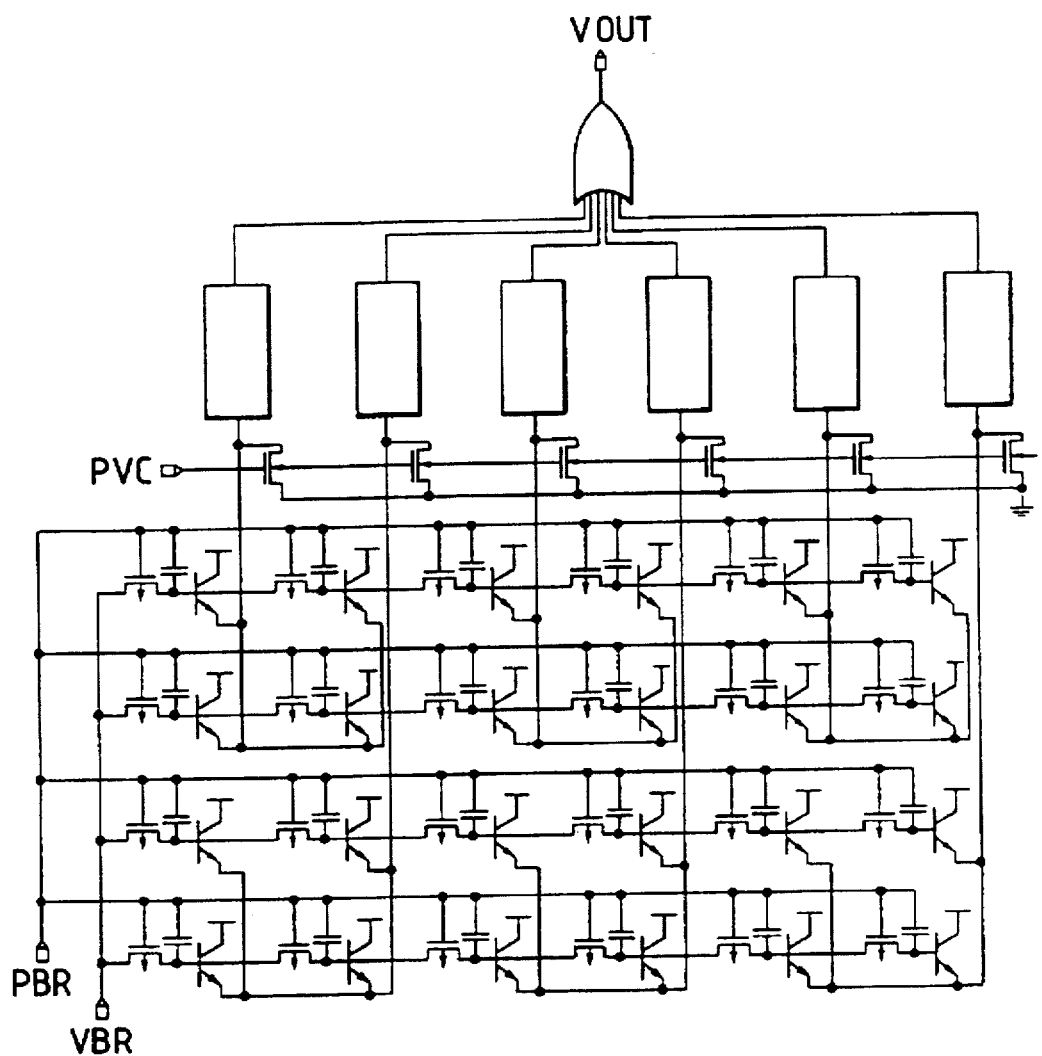
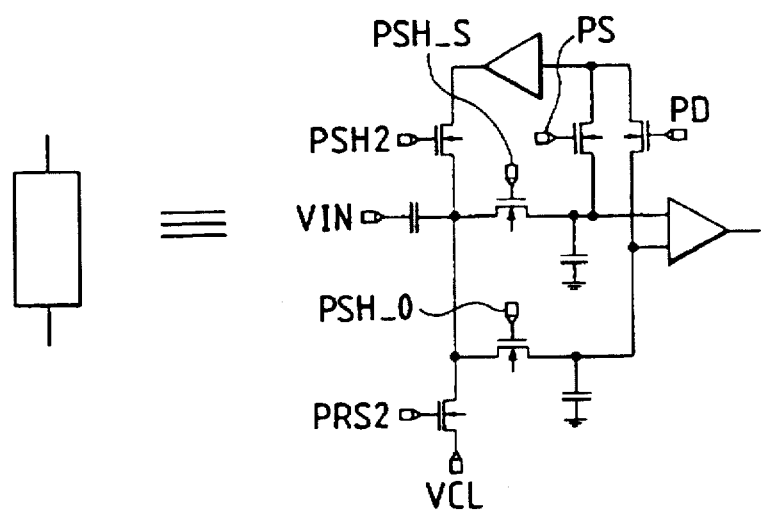

IMAGE PICKUP DEVICE IN WHICH THE LIGHT RECEIVING ELEMENT, THE DRIVE CIRCUIT FOR ILLUMINATING MEANS, AND THE DRIVE CIRCUIT FOR THE LIGHT RECEIVING ELEMENT ARE ON THE SAME CHIP

BACKGROUND OF THE INVENTION

1. Field of the Invention

The present invention relates to an image pickup device for use as an image sensor for a copying machine, a facsimile apparatus, a video camera or the like, or a sensor for detecting the presence or absence of a subject to be photographed or an object, and particular to an image pickup device having a drive circuit for illuminating means.

2. Related Background Art

FIG. 16 is a typical diagram showing a conventional image pickup device, wherein a light source 3 as illuminating means illuminates an object 1, a reflected light from which is received by a solid image pickup element 6 such as a CCD. Herein, 5 is a lens as the optical system for illumination, and 4 is a lens as the optical system for imaging, wherein the light source 3 emits the light with a power supplied from a power source 16 by means of a drive circuit 7. On the other hand, the solid image pickup element 6 is supplied with a power from another power source 15, and driven by a drive circuit 8'. 8 is a controller for controlling two drive circuits 7', 8' based on the on/off of a power switch not shown. Of course, the controller 8 itself is supplied with a power from a power source not shown.

However, with the conventional devices, because the light source 3 and the drive circuits 7', 8' for the solid image pickup element 6 were constituted of separate ICs, respectively, the number of wirings or the packaging area was increased, which impeded the reduction of apparatus size. And because the controller 8 which was a control circuit was constituted of still another IC, the further reduction of apparatus size was impeded. And because the light source was always lighted up, and the solid image pickup element was driven only for a predetermined period of image pickup, multiple voltage levels were required with separate power sources 15, 16 provided.

On the other hand, for the detection of a minute object such as a medical camera, further miniaturization is desired. Also, in the battery driven apparatuses, it is desired to simplify the power source and have lower consumption electric power.

SUMMARY OF THE INVENTION

An object of the present invention is to solve the aforementioned technical problems and to provide a light receiving device which can reduce the size of apparatus and be driven by a low consumption electric power.

It is another object of the present invention to provide a light receiving device having illuminating means for illuminating an object and a light receiving element for receiving the light from said object, characterized in that a drive circuit for driving said illuminating means and a drive circuit for driving said light receiving element or a control circuit for controlling it are integrated with said light receiving element into one chip.

According to the present invention, by integrating a drive circuit for illuminating means and a control circuit for controlling the driving of light receiving element, the operation by a single power source is enabled, and the miniaturization can be effected. Further, by supplying a illumination control signal from the control circuit owing to the integration, it is easily made to synchronize the pass timing with the drive timing of light receiving element.

BRIEF DESCRIPTION OF THE DRAWINGS

FIG. 14 is a circuit diagram of an image pickup device in an example 7 of the present invention.

DETAILED DESCRIPTION OF THE PREFERRED EMBODIMENTS

Figure 1A:
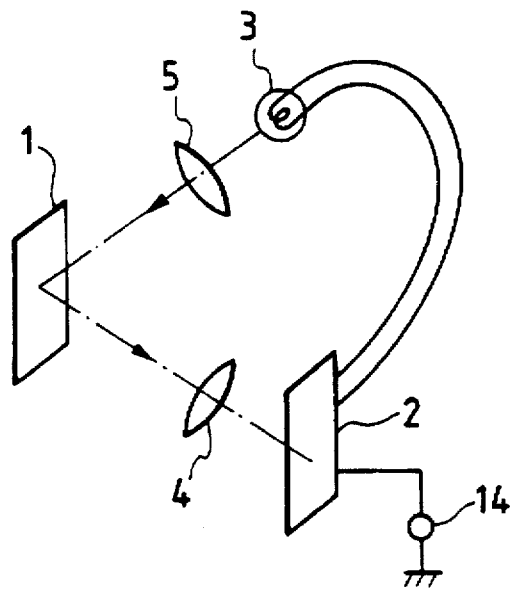
FIGS. 1A and 1B are typical views for explaining an image pickup device in accordance with an embodiment of the present invention.
Figure 1B:
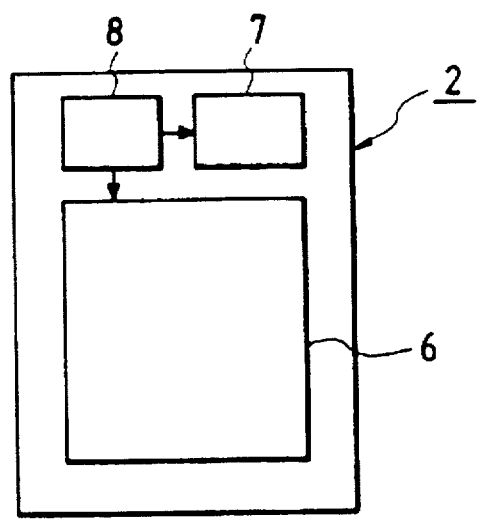
Figure 6:
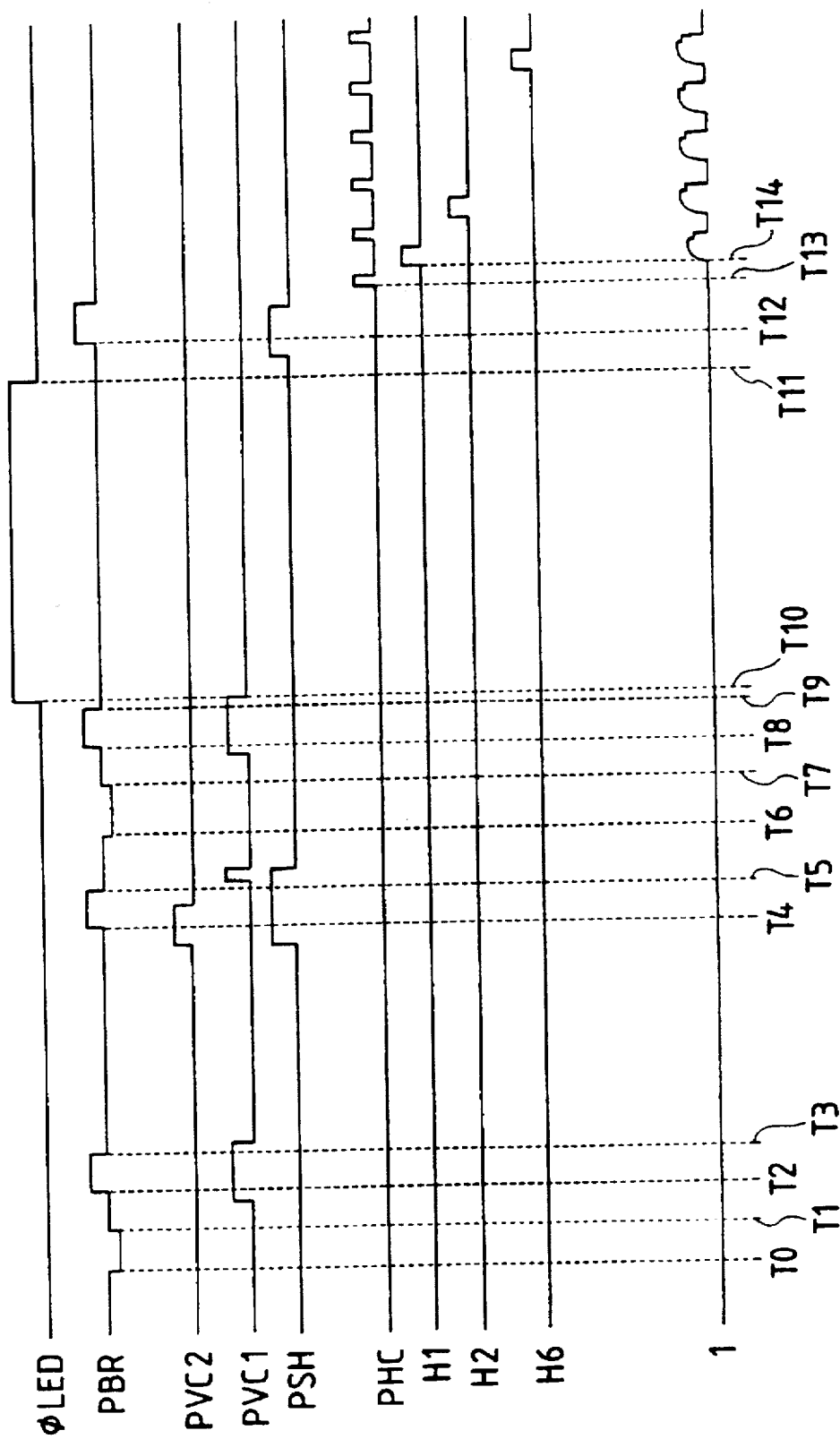
FIG. 6 is a timing chart for explaining the operation of the image pickup device in the example 3 of the present invention.

FIGS. 1A and 1B are schematic views of an image pickup system which is simplest, using a solid image pickup device, wherein 1 is an object, 2 is a solid image pickup device as the light receiving device, 3 is illuminating means such as an LED, and 4 and 5 comprises an optical system composed of imaging lenses is provided as necessary. As shown in FIG. 1B, 6 is a photoelectric conversion unit as the light receiving element, 7 is a drive circuit of illuminating means 3, and 8 is a timing controller as the control circuit.

In such a system, there are two cases, one in which the solid image pickup device and the illuminating means are operated asynchronously and one in which they are operated synchronously.

In the asynchronous case, for example, the illumination system makes the operation (illumination) of always directing the light to an object and the solid image pickup device makes a predetermined photoelectric conversion operation, while in the synchronous case, for example, illuminating means is operated only during the period for which the solid image pickup device stores photocarriers to direct light to the object, and is turned to a non-operating condition for disenabling illumination during other than that period. In the latter case, the consumption of electric power of illuminating means can be suppressed to a lower value, whereas there are various restrictions on the operation timing.

Thus, the present invention is directed to a semiconductor integrated circuit as one chip with a drive circuit for illumination contained within a solid image pickup device. Accordingly, the power source may be of the multi-system as conventional, but can be integrated as one system such as a power source 14. The photoelectric conversion unit 6 for use with the present invention is preferably an optical sensor having photodiodes or phototransistors as a unit cell, and using a CCD or MOS transistor as the scan circuit. More preferably, a non-destructive optical sensor may be used for the low consumption power, wherein photocarriers are stored in a gate or a base as the control electrode region and the scanning is performed according to the XY address system. The light source may be a fluorescent lamp, a halogen lamp, or a xenon lamp, but preferably may be an electroluminescence element or electrochromic element as the low consumption power type, and more preferably may be a light emitting diode (LED).

The drive circuit for illumination is desirably a circuit for supplying a constant current to the light source using a current mirror circuit, and the timing controller preferably contains a pulse generator.

Further, the lighting period or the timing of the light source is desirably made variable depending on the storage time of the optical sensor. In either case, it is desired that the light source is lighted up only during the minimum period as necessary. And to prevent any false detection of the object, it is desirable to operate the light source in such a manner that with a time interval set, the lighting and image pickup are performed for a plurality of periods, and only when substantially the same output signals are obtained, is the output signal processed. In the following examples, the image pickup of only one time period is shown, but this operation is repeated for a plurality of periods with a time interval therebetween.

It will be appreciated that the signal for activating (turning on) the drive circuit 7 for illuminating means may be a signal output from the drive circuit of the light receiving element 6.

EXAMPLE 1

Figure 2:
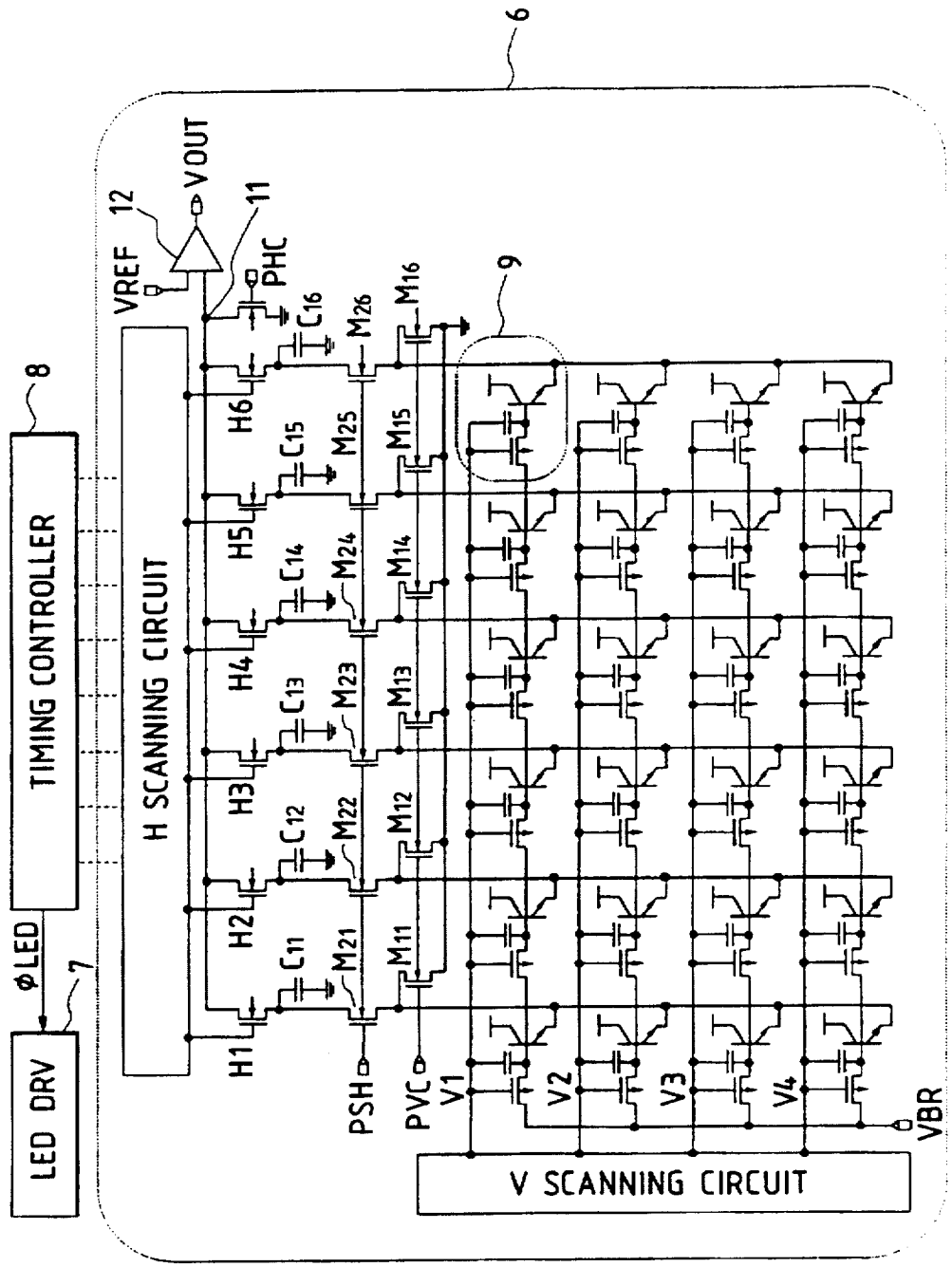
FIG. 2 is a circuit diagram of an image pickup device in an example 1 of the present invention.

In a schematic diagram of FIG. 2, 6 is a photoelectric conversion unit, 7 is a drive circuit of illuminating means, and 8 is a timing controller, all the circuits as shown in FIG. 2 being integrated into one chip.

Figure 3:
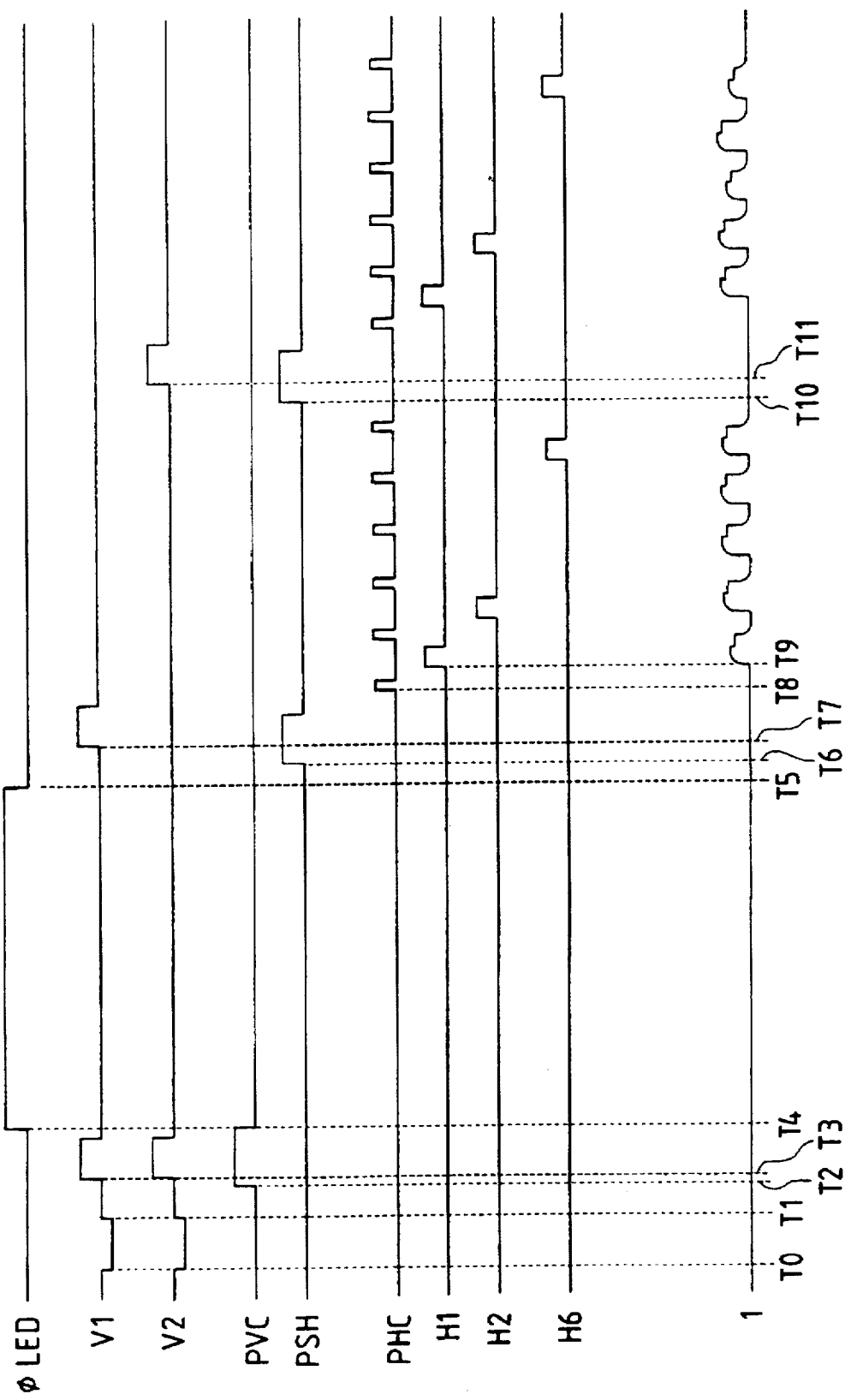
FIG. 3 is a timing chart for explaining the operation of the image pickup device in the example 1 of the present invention.

This example will be outlined briefly below, using a timing chart of FIG. 3. This example uses a device of the type in which photocarriers are stored in the base region for bipolar transistor as the photoelectric conversion element, wherein an area 9 encircled by the dotted line in FIG. 2 is a unit pixel array. And a reverse bias power source (not shown) is connected to the collector. All the pulses for operating the photoelectric conversion element are generated by the timing controller 8. At first, an initialization (clamp reset) is performed in which a low-level pulse is applied to the drive lines V1 to V4 during a period from time T0 to T1 to turn on all the PMOS transistors within a pixel to thereby hold the base regions for all the pixels at a predetermined reference potential by a voltage applied to a terminal VBR as the reference voltage source. If the clamp reset is completed, the drive lines V1 to V4 are at the intermediate level.

Then, if at time T3, a high-level pulse is applied to a PVC terminal as the reference voltage source to turn on the MOS transistors M11 to M16, and then a high-level pulse is applied the drive lines V1 to V4 at time T3, with the emitter terminal for each photoelectric conversion element set at a ground potential which is another reference potential, the base potential of NPN transistor rises via a capacitor provided in each photoelectric conversion element, and by effecting an emitter follower operation, a reset operation (transient reset) is performed which can reduce the variation in each base potential.

If the transient reset is terminated, V1 to V4 are set at the intermediate level, so that the base potential for each NPN transistor is deflected to the negative side and the base-emitter potential is biased in the reverse direction, whereby the storage operation of photocarriers is started.

If the timing controller generates, during this storage operation, a pulse (øLED) which is at the high level from time T4 to T5, the drive circuit 7 of illuminating means is activated to supply a current for lighting an LED as illuminating means to the LED.

Accordingly, LED 3 illuminates an object 1, as shown in FIG. 1A, the reflected light from which is converted into an electrical signal.

If the storage operation of photoelectric conversion element is terminated, a high-level pulse is applied to PSH at time T6 to turn on the MOS transistors M21 to M26. At time T7, if a high-level pulse is applied to the drive line V1, the base potential of each photoelectric conversion element at the first line is risen to bias the base-emitter potential in the forward direction, so that a light signal is read as the voltage into the capacitors $C_{11}$ to $C_{16}$ as the load. Thereafter, by activating a horizontal scan circuit 20, the signal at the first line is sequentially transferred pixel by pixel to an output line 11 in time series, and by making a comparison operation with the reference voltage VREF of reference voltage source in a comparator 12, the presence or absence of reflected light of LED can be determined.

Accordingly, with this example, if the solid image pickup device itself integrated in one chip is caused to drive illuminating means, and its reflected light is converted into electrical signal, the synchronism with the illumination system can be simply effected, whereby it is possible to detect simply and at low consumption power whether there exists any object in the object area, for example.

EXAMPLE 2

Figure 4:
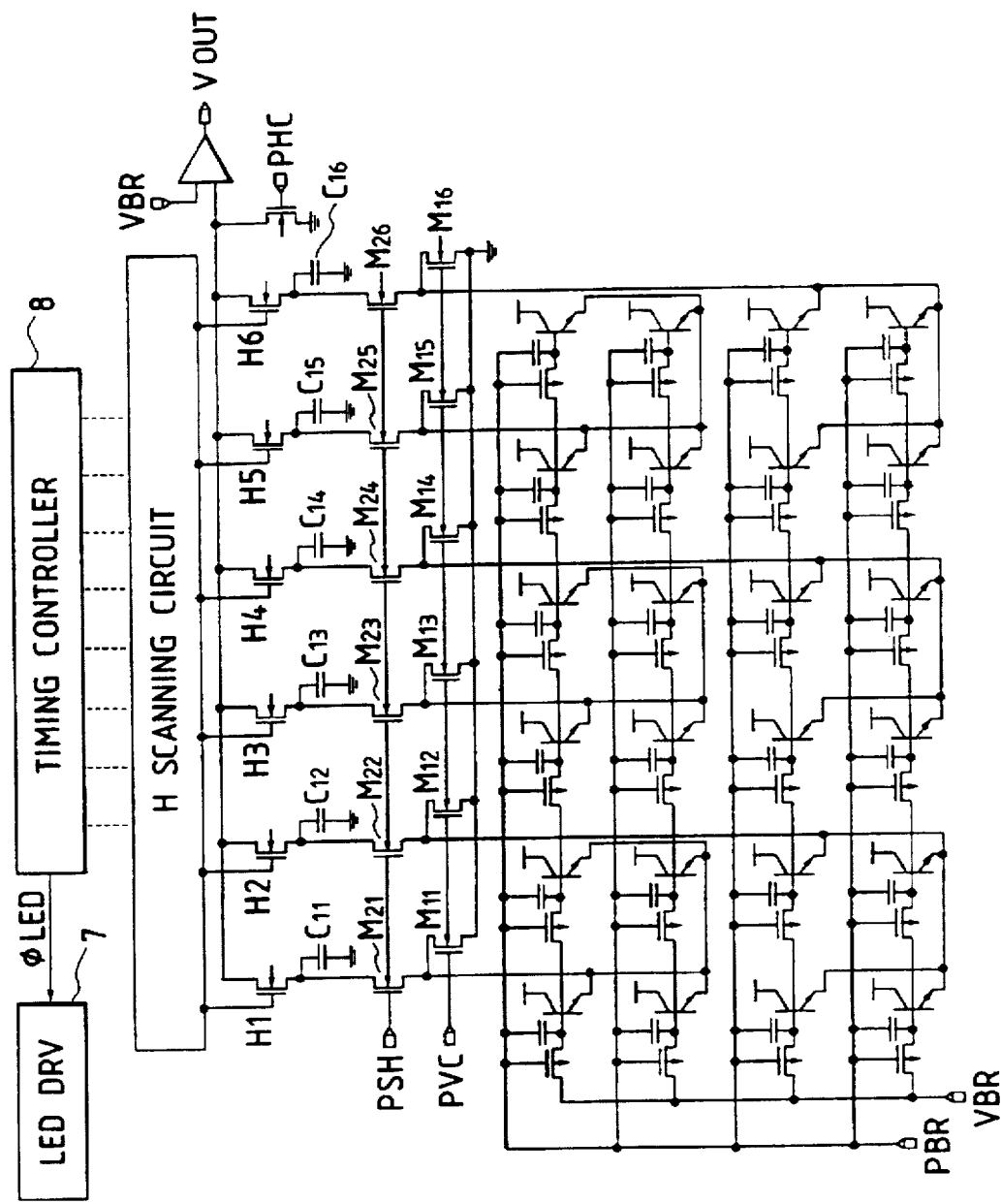
FIG. 4 is a circuit diagram of an image pickup device in an example 2 of the present invention.

FIG. 4 shows a solid image pickup device constructed in one chip in the second example of the present invention.

The configuration is substantially the same as that of example 1, with the exception that a total of four pixels consisting of two vertical pixels and two horizontal pixels adjacent the emitter terminal of each photoelectric conversion element is wired connected and no vertical scan circuit is provided. In this example, the reading operation of pixel is simultaneously effected for all the pixels, and the comparison operation is performed using the peak output in units of 2×2 pixels. The operation involves making the clamp reset and the transient reset simultaneously for all the pixels, then reading a signal into the capacitors $C_{11}$ to $C_{16}$, and making a horizontal scan.

Accordingly, there are the advantages over the example 1 that the chip size can be reduced, and the calculation time can be shortened. In this example, the position of a light such as a minute spot light can be detected, and the signal processing can be performed at high speed.

EXAMPLE 3

Figure 5:
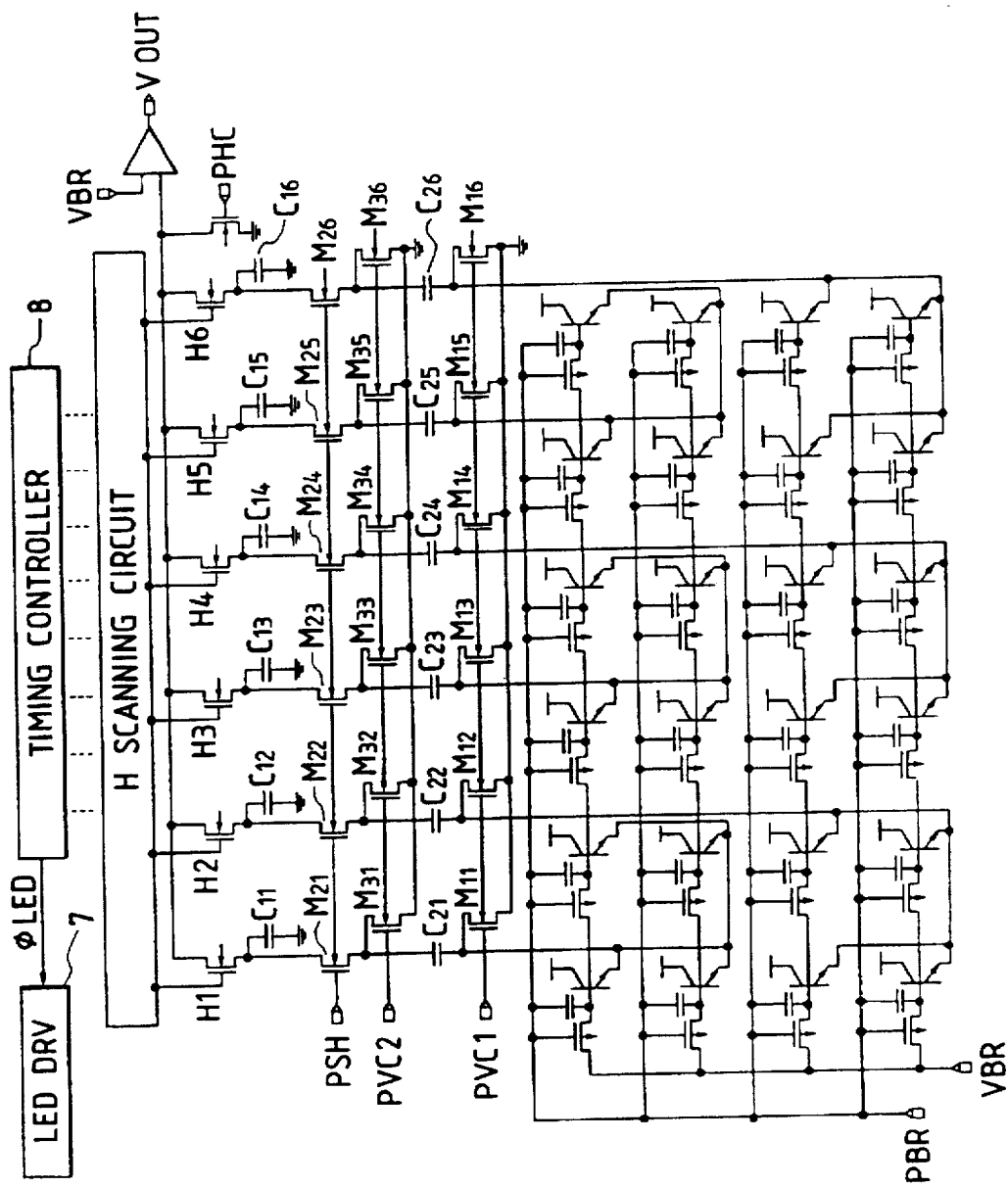
FIG. 5 is a circuit diagram of an image pickup device in an example 3 of the present invention.

FIG. 5 shows a solid image pickup device constructed in one chip in the third example of the present invention.

In the examples 1, 2, the reflected light of LED is photoelectrically converted into electrical signal, and the comparison operation is made based on its signal, but there is the disadvantage that for example, when an external light other than LED light strongly impinges on the object portion, it is difficult to determine whether the detected light is the reflected light from the object or the external light.

Accordingly, by holding the signal due to the external light and then making a differential operation between it and the signal due to the reflected light of LED, the comparison operation can be effected using the signal with the external light component removed.

Using a timing chart of FIG. 6, the operation will be briefly described.

The clamp reset is effected from time T0 to T1, and the transient reset is effected from time T2 to T3, whereafter the storage of carriers into the base of transistor is started. During this period, LED is not lighted. Hence, the carriers stored in each base include thermally generated carriers (dark voltage component) and/or external light generated carriers (external light component).

After terminating the storage, a high-level pulse is applied to the terminal PSH, PVC2 to turn on the MOS transistors M21 to M26 and M31 to M36. With the capacitors $C_{11}$ to $C_{16}$ at the ground potential level, if the signal is read at time T4, a peak signal of each block is read into the input side terminals of capacitors 21 to 26.

Thereafter, PVC2 is decreased to the low level, the MOS transistors M31 to M36 are turned off, the output side terminals of capacitors $C_{11}$ to $C_{16}$ are made floating, the pulse of PBR is risen to the intermediate level, and the reading operation is completed. Then, if a high-level pulse is applied to PVC1 to turn on the MOS transistors M11 to M16, the potential of capacitor $C_{11}$ to $C_{16}$ is expressed by:

$$-\frac{C_1}{C_1+C_2} V_{Ni} \quad (i = 1 \text{ to } 6)$$

$C_1$ ... Capacitor values of $C_{11}$ to $C_{16}$
$C_2$ ... Capacitor values of $C_{21}$ to $C_{26}$
$V_{Ni}$ ... Peak signal due to external light of block i Thereafter, PSH is caused to fall to the low level to turn off the MOS transistors M21 to M26, whereby each voltage is held.

Then, after the clamp reset is effected again at time T6 to T7, and the transient reset is effected at time T8 to T9, the storage is started again. Then, if at time T10 to T11 during this period of storage, øLED is risen to the high level, an illumination system drive circuit is activated, so that LED is lighted up. Accordingly, in addition to the external light component already stored, the light signal due to the reflected light from LED is stored in each photoelectric conversion element.

After terminating the storage, LED is lighted off, a high-level pulse is applied to PSH to turn on the MOS transistors M21 to M26. At time T12, if the peak signal is read from each block, the potential of capacitor $C_{11}$ to $C_{16}$ is expressed by:

$$-\frac{C_1}{C_1+C_2} (V_{Si} - V_{Ni}) \quad (i = 1 \text{ to } 6)$$

$V_{Si}$ ... Peak signal due to external light and reflected light from LED

At time T13 and beyond, the horizontal scan is performed in the same way as in example 2, and the comparison operation is made. In this way, using the signal with external light component removed, it is possible to determine whether any object approaches to the object area, resulting in the improvement of precision. If the photoelectric conversion element of non-destructive read type is used, the external light component removal can be easily effected.

EXAMPLE 4

Figure 7:
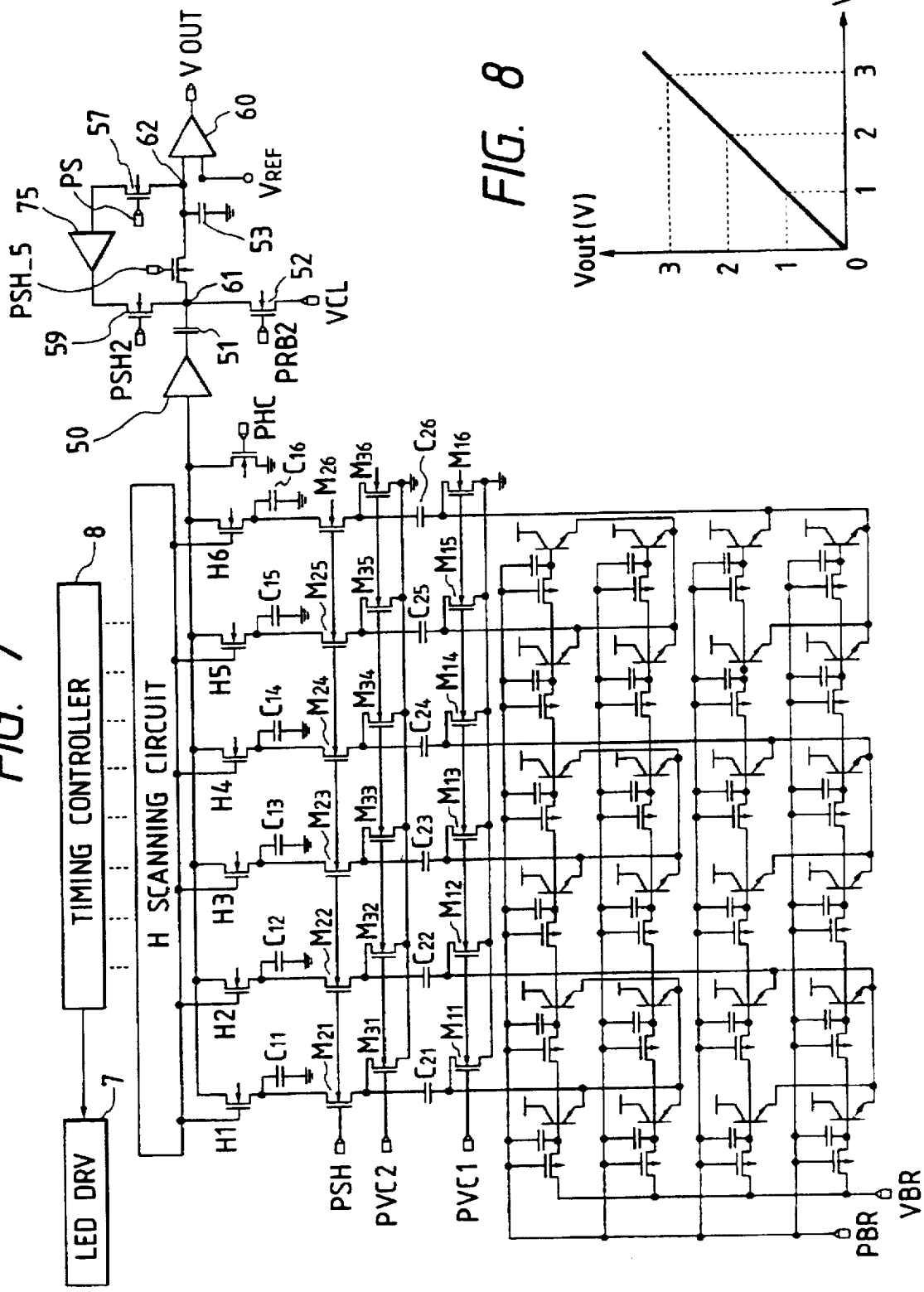
FIG. 7 is a circuit diagram of an image pickup device in an example 4 of the present invention.

FIG. 7 shows a solid image pickup device constructed in one chip in the fourth example of the present invention.

This example is intended to further raise the precision of example 3, in such a way that a plurality of LEDs are lighted up and the signals due to the reflected lights from the plurality of LEDs imaged onto different blocks are added spatially.

Figure 8:
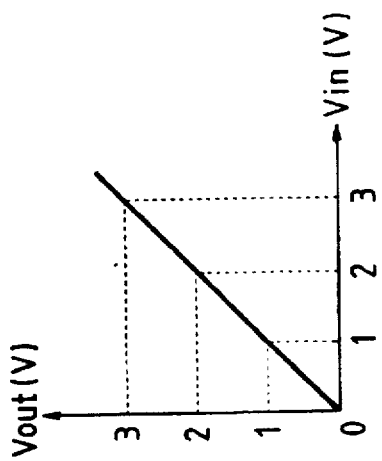
FIG. 8 is a graph showing the characteristic of an amplifier for use with the image pickup device in the example 4 of the present invention.
Figure 9:
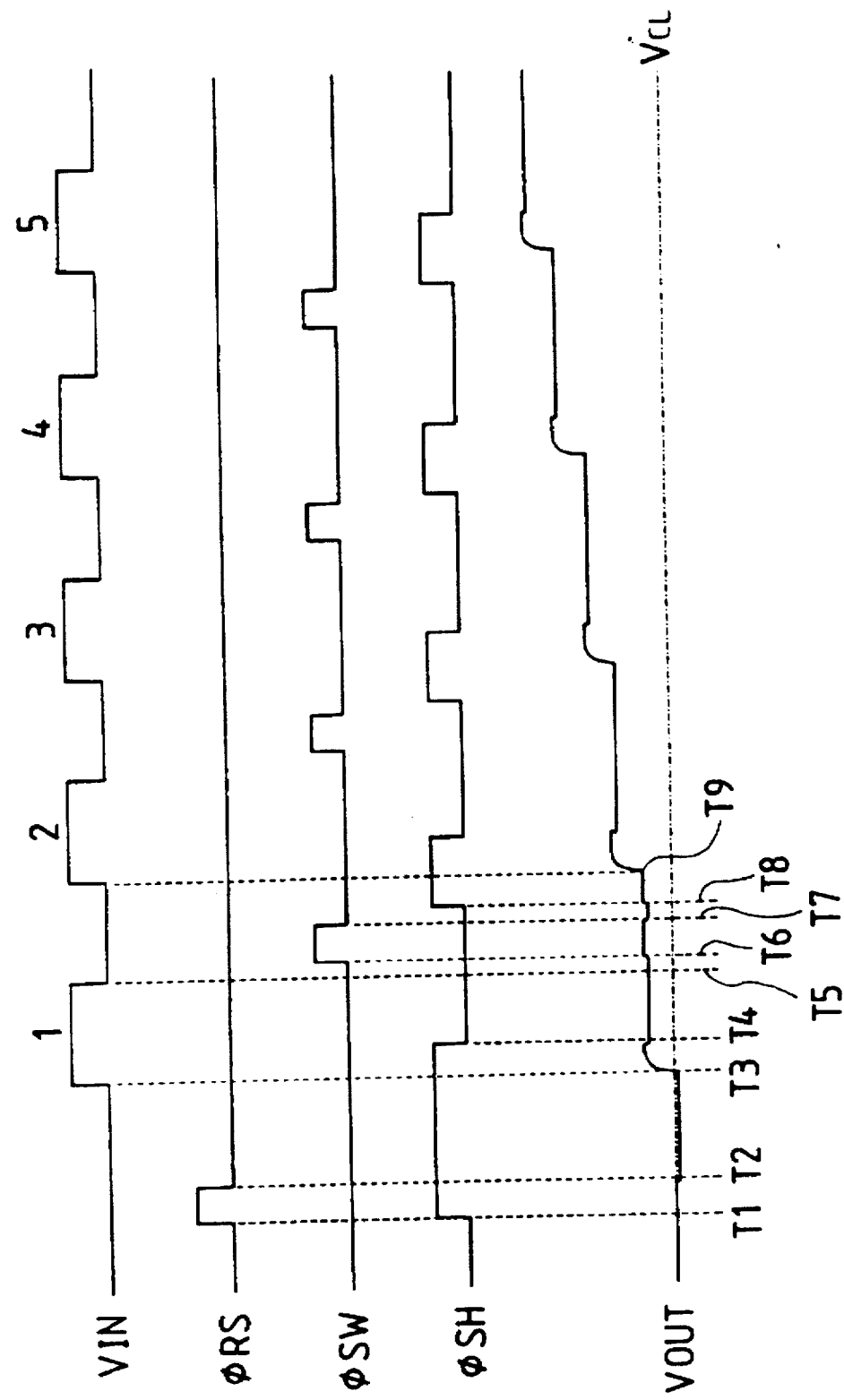
FIG. 9 is a timing chart for explaining the operation of the image pickup device in the example 4 of the present invention.

The photoelectric conversion operation is performed in exactly the same way as in example 3, and a peak signal of each block is held into the capacitors $C_{11}$ to $C_{16}$. Thereafter, a horizontal scan circuit is activated, and a signal of each capacitor $C_{11}$ to $C_{16}$ is read sequentially. This signal is amplified by a preamplifier 50, and input into an analog addition circuit at the next stage. This analog addition circuit is comprised of capacitor means 51 serving as the coupling capacitor to take out the AC signal component of input signal, reset means 52, sampling means 55 which is connecting means, holding means 53 which is signal holding means, buffer means 75 as adding means, and switching means 59. Also, the input/output characteristics of buffer means 75 has a characteristic of the line passing through an origin, with a slope of 1, as shown in FIG. 8. Next, referring to a timing chart of FIG. 9, the operation of this example will be briefly described.

First, if the pulses of PRS2 and PSH-S get high-level at time T1, the MOS transistors 52, 55 are turned on, and a node 61 and a hold capacitor 2 are initialized by a voltage supplied to a terminal VCL.

At time T2, PRS2 becomes the low level, the MOS transistor 52 is turned off, and the node 61 and a hold capacitor 53 are placed in the floating state.

Then, at time T3, the input signal 1 is risen, the potential of the hold capacitor 53 which is in the floating state is raised via a capacitor 51. The voltage elevation width at this time is expressed by:

$$\frac{C_1}{C_1+C_2} V_{S1} \quad (4.1)$$

$C_1$ ... Capacitor value of capacitor means 51
$C_2$ ... Capacitor value of hold capacitor 53
$V_{S1}$ ... Voltage value of signal Next, if PSH-S falls down at time T4, the hold capacitor 53 is separated from the node 61, so that even if the input signal falls down at time T5, there is no influence of the input signal which falls down.

On the other hand, the potential of the node 61 decreases with the falling input signal.

Then, if the PSH2 pulse becomes high-level at time T6, the output of buffer 75 is connected to the node 61, so that the node 62 and the node 61 are placed at the same potential.

At time T6, if the PSH2 pulse becomes low-level, the switching MOS transistor 59 is turned off, and the node 61 is separated from the buffer 75. Then, at time T7, PSH-S pulse becomes high-level, the sampling MOS transistor 55 is turned on. Further, at time T9, when a next input signal 2 is supplied to the input terminal, the voltage of hold capacitor 53 rises and can be expressed by:

$$V_{CL} + \frac{C_1}{C_1+C_2}(V_{S1}+V_{S2}) \qquad (4.2)$$

where $V_{S2}$ is a voltage value of signal 2, whereby the analog addition of input signal can be implemented. By repeating the above operation, the adding operation $$\frac{C_1}{C_1+C_2} \times \sum_{i=1}^{n} V_{Si} \qquad (4.3)$$

can be effected.

Accordingly, with a plurality of LEDs lighted up, it is possible to determine, from the comparison operation, whether or not the signals due to the reflected lights are obtained by a plurality of blocks, so that the detection precision can be improved.

EXAMPLE 5

In example 4, the buffer 75 was described having the ideal characteristic as shown in FIG. 8. However, there is a finite offset voltage $V_{of}$ as indicated by the dashed line in FIG. 10. In this case, since with a configuration of FIG. 7, the feedback with the buffer is performed for each adding operation, its error increases with larger number of additions.

Figures 10, 11:
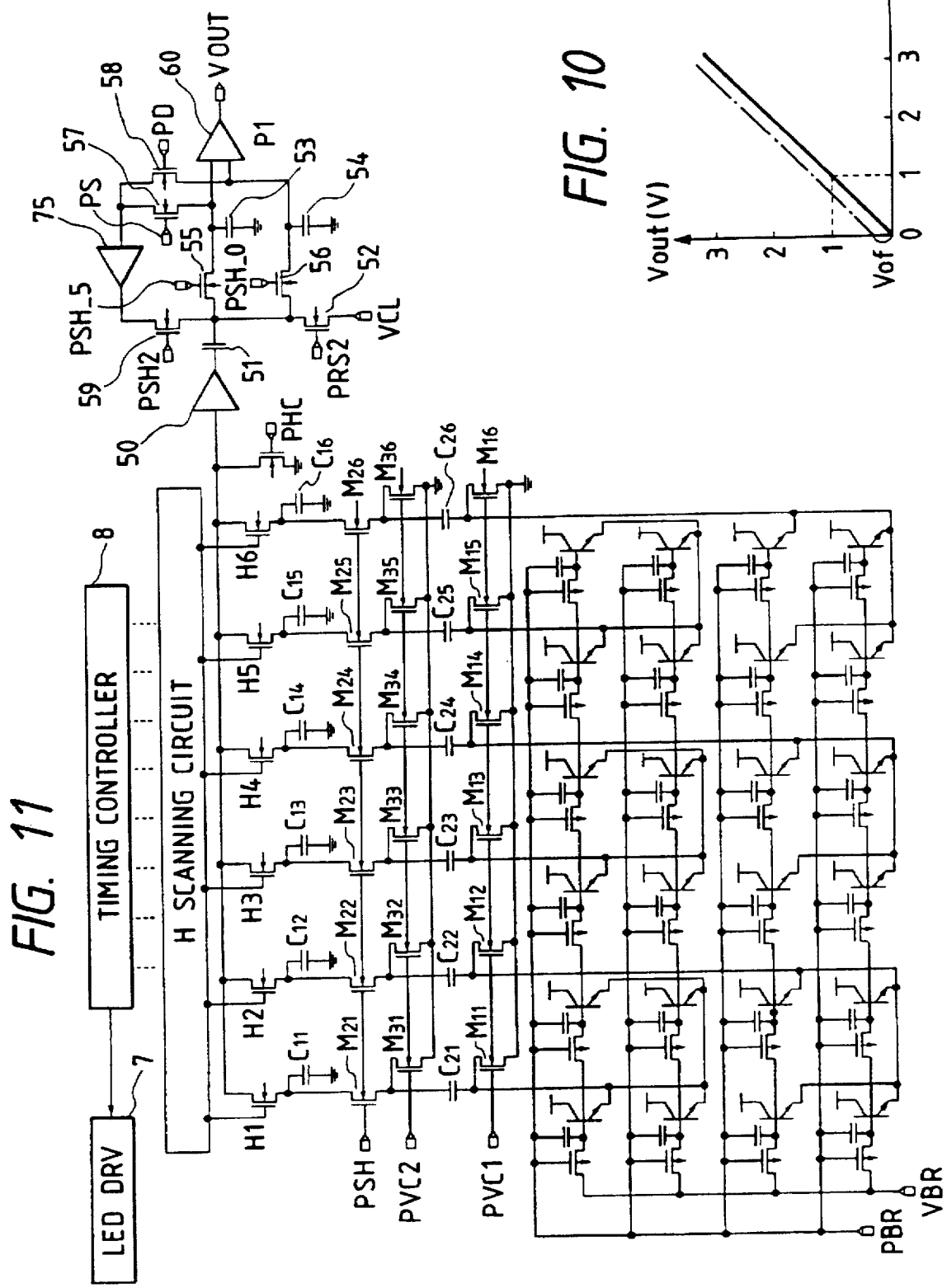
FIG. 10 is a graph showing the characteristic of an amplifier for use with an image pickup device in an example 5 of the present invention.
FIG. 11 is a circuit diagram of the image pickup device in the example 5 of the present invention.

In this example, even if an offset voltage exists in the buffer 75, the correct adding operation can be effected, with its configuration as shown in FIG. 11.

Figure 12:
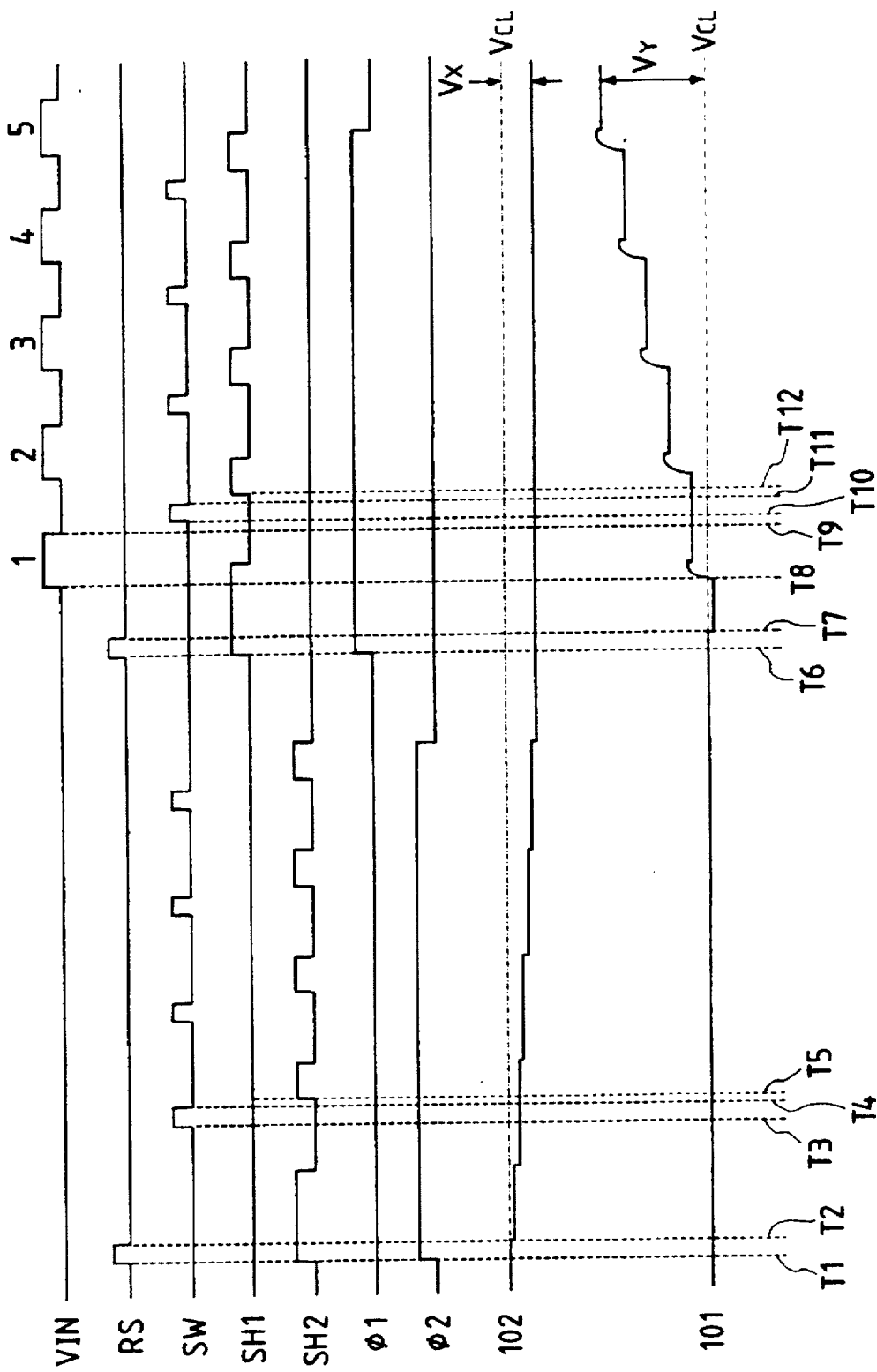
FIG. 12 is a timing chart for explaining the operation of the image pickup device in the example 5 of the present invention.

The operation of this example will be briefly described using a timing chart of FIG. 12.

In FIG. 12, five signals are input as the input signal, wherein first, at times T1 to T6, are reference level is input into the input terminal, while the adding operation as described in example 4 is repeated by five times. Herein, an operating system is comprised of a capacitor 51, a sampling MOS 56, a hold capacitor 54, switching means 58, a buffer 75, and switching means 59. Note that during this period, a pulse of low level is applied to PS and a pulse of high level to PD, so that the MOS transistors 57, 58 are turned off and on, respectively, which is exactly the same operation as described in example 4, whereby the operation error voltage corresponding to five operations is held in the hold capacitor 54.

Then, if at time T6 and beyond, five input signals are input, the operation result containing five operation errors is held in the hold capacitor 53.

During this period, a pulse of high level is applied to PS, and a pulse of low level to PD, so that the MOS transistors 57, 58 are turned on and off, respectively, wherein an operating system is comprised of a capacitor 51, a sampling MOS 55, a hold capacitor 53, switching means 57, a buffer 75, and switching means 4. After the above operation is terminated, a comparison operation between hold capacitors 53, 54 is made whereby it is possible to detect whether or not any object approaches thereto, depending on whether there is a difference greater than or equal to a predetermined level.

While in this example, the period for which the offset voltage for the buffer 5 is added and that for which the signal is added are completely separated, it will be appreciated that with the signal addition of one time, the period for which the signal itself is added and that for which the offset voltage of buffer is added are alternately provided.

EXAMPLE 6

Figure 13:
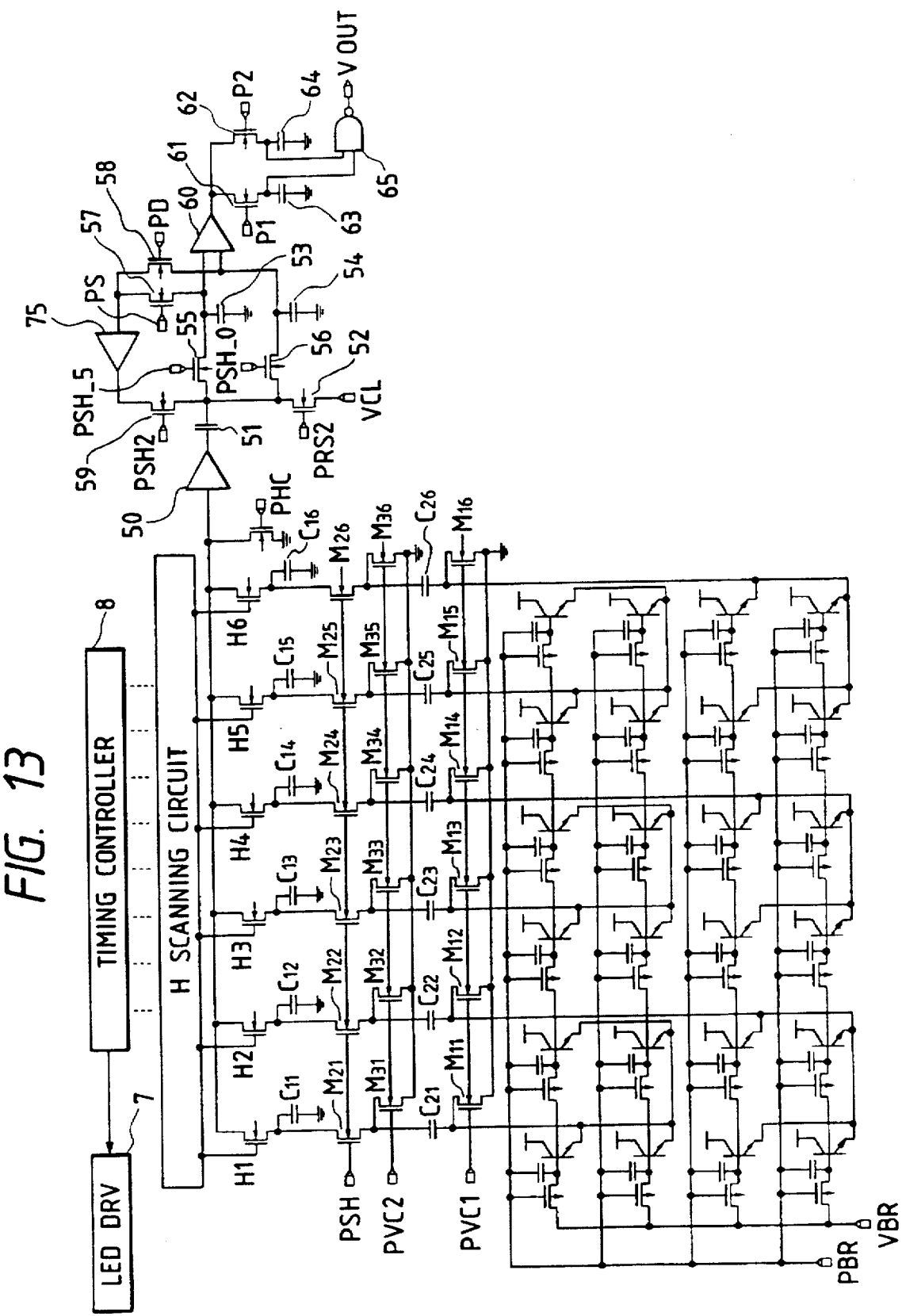
FIG. 13 is a circuit diagram of an image pickup device in an example 6 of the present invention.

A configuration diagram of this example intended to improve the detection precision of example 5 is shown in FIG. 13.

That is, the operation of example 5 is repeated by multiple times to obtain a logical operation result as the final output. In FIG. 13, two operations are performed, wherein the first operation result is held in capacitor means 63, and the second operation result is held in capacitor means 64, whereby only when the partner is "1", "1" is output.

Thereby, the detection error due to, for example, flash in the external light can be prevented.

EXAMPLE 7

A seventh example of the present invention is shown in FIG. 14.

This example is intended to add the signal with the external light removed for each block by flashing LED multiple times. Accordingly, it is configured in such a way that an analog addition circuit as shown in example 6 is provided for each block, and further its output is logically operated. Thereby, it is possible to detect whether or not there is any object within the same block at multiple times, so that the improved detection precision can be effected.

Also, when the external light illuminance is great, there is the advantage that the circuit itself is difficult to saturate despite of the greater number of additions because of the removal of external light component prior to the addition of analog signal.

Figure 15:
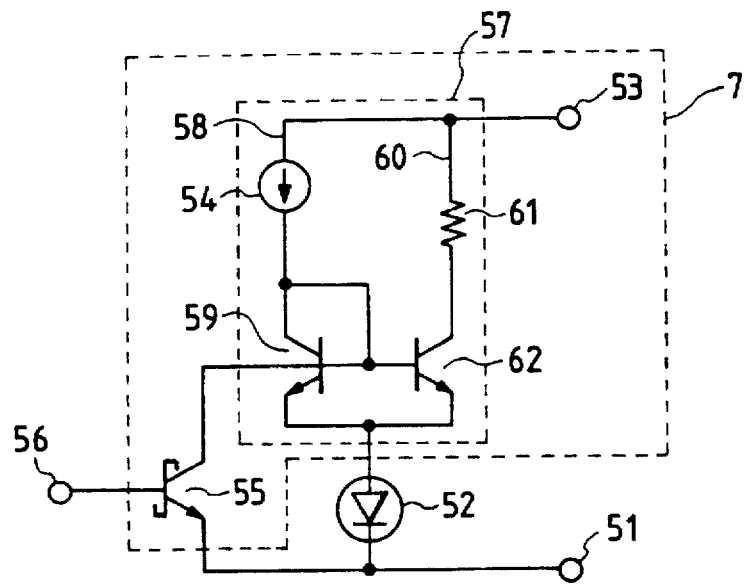
FIG. 15 is a drive circuit of illuminating means for use with the present invention.
Figure 16:
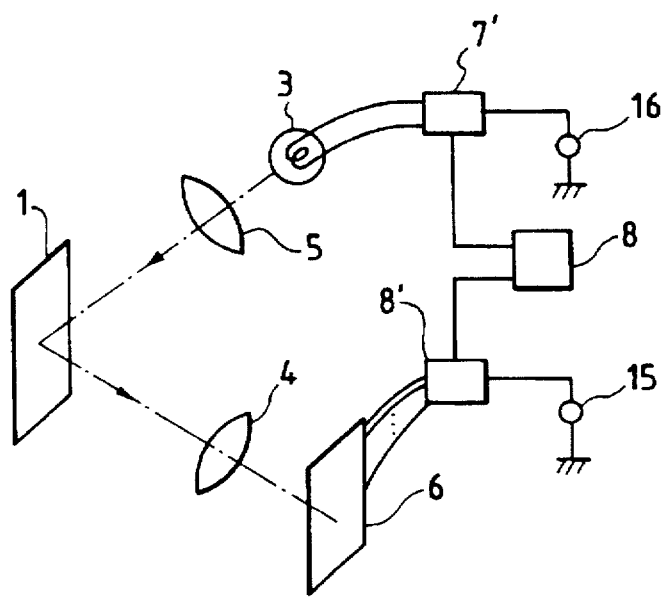
FIG. 16 is a typical view for explaining a conventional image pickup device.

FIG. 15 is a circuit diagram showing an example suitable for the drive circuit of illuminating means for use in the present invention.

52 is a light emitting element such as LED which is illuminating means, 57 is a current mirror circuit, 55 is an active element, 53 is a reference voltage source terminal of high potential, 51 is a reference voltage source terminal of low potential, and 56 is an input terminal into which a pulse øLED output from the timing controller is input.

The current mirror circuit 57 has a constant current source 54, two npn transistors 59, 62 and a resistive element 61.

And a drive circuit 7 as shown in FIG. 1B includes a circuit 57 and an element 55.

This drive circuit is comprised of a semiconductor light emitting element having a cathode connected to the low voltage point, an active element which is switched by the control signal, with one end connected to the same low voltage point, and a current mirror circuit disposed between a high voltage point and an anode of the semiconductor light emitting element, the other end of the above active element being connected to the current mirror circuit to divert the input current of the above current mirror circuit.

In this drive circuit, the current lower than a drive current value necessary for the light emission of semiconductor light emitting element is flowed into the input stage as the input current into the current mirror circuit. When the semiconductor light emitting element is caused to emit light, the input current is increased by the current mirror circuit by turning off the switching active element, and a drive current necessary for the semiconductor light emitting element to emit light is applied to the semiconductor light emitting element, so that the semiconductor light emitting element can emit light. Also, when stopping the light emission of the semiconductor light emitting element, the input current flowing into the input stage of the current mirror circuit is flowed into the active element for switching by turning on the active element for switching, so that no drive current necessary for emitting light flows through the semiconductor light emitting element.

Thus, by controlling the switching of the active element with the pulse øLED, it is possible to provide an image pickup device of lower consumption power.

As above described, with the present invention, two drive circuits for illumination and light receiving element are integrated into one chip together with the light receiving element, whereby the simplification and lower consumption power can be accomplished. A term "one chip" referred to in the present invention is one in which elements are integrated on a single crystal or SOI substrate by an IC technology such as film formation, impurity diffusion or etching, the substrate being prepared using a semiconductor wafer technology, a bonding technology of SIMOX semiconductor layer, or an epitaxial growth technology.

With the present invention, an image pickup device can be provided in reduced size and of the low consumption power type.

What is claimed is:

1. An image pickup device for use with illuminating means for illuminating an object, said device comprising:

a semiconductor chip;

a plurality of image pickup elements integratedly formed on said chip for picking up an image of the object illuminated by the illuminating means;

a drive circuit integratedly formed on said chip for driving the illuminating means;

a control circuit integratedly formed on said chip for controlling driving of said image pickup elements and controlling said driving circuit; and a XY address scan circuit for addressing said image pickup elements.

2. An image pickup device for use with illuminating means for illuminating an object, said device comprising:

a semiconductor chip;

a plurality of image pickup elements integratedly formed on said chip for picking up an image of the object illuminated by the illuminating means;

a drive circuit integratedly formed on said chip for driving the illuminating means; and a control circuit integratedly formed on said chip for controlling driving of said image pickup elements and controlling said driving circuit, each said image pickup element having a non-destructive photosensor in which photocarriers are stored in a gate of a MOS transistor.

3. An image pickup device for use with illuminating means for illuminating an object, said device comprising:

a semiconductor chip;

a plurality of image pickup elements integratedly formed on said chip for picking up an image of the object illuminated by the illuminating means; and a drive circuit integratedly formed on said chip for driving the illuminating means; and a control circuit integratedly formed on said chip for controlling driving of said image pickup elements and controlling said driving circuit, said image pickup elements being of a non-CCD type.

4. An image pickup device for use with illuminating means for illuminating an object, said device comprising:

a semiconductor chip;

a plurality of image pickup elements integratedly formed on said chip for picking up an image of the object illuminated by the illuminating means;

a drive circuit integratedly formed on said chip for driving the illuminating means; and a control circuit integratedly formed on said chip for controlling driving of said image pickup elements and controlling said driving circuit, wherein said drive circuit turns on the illuminating means at least twice during a predetermined time interval, and when one of said image pickup elements twice picks up a same output signal, the output signal is processed.

5. An image pickup device for use with illuminating means for illuminating an object, said device comprising:

a semiconductor chip;

a plurality of image pickup elements integratedly formed on said chip for picking up an image of the object illuminated by the illuminating means; and a drive circuit integratedly formed on said chip for driving the illuminating means; and a control circuit integratedly formed on said chip for controlling driving of said image pickup elements and controlling said driving circuit, wherein said image pickup elements are of a non-destructive type, and said device further comprises a comparator for making a comparison between a first output signal, read out from said image pickup elements upon turning off the illuminating means and a second output signal, read out from said image pickup elements upon turning on the illuminating means.

6. An image pickup device for use with illuminating means for illuminating an object, said device comprising:

a semiconductor chip;

a plurality of image pickup elements integratedly formed on said chip for picking up an image of the object illuminated by the illuminating means; and a drive circuit integratedly formed on said chip for driving the illuminating means; and a control circuit integratedly formed on said chip for controlling driving of said image pickup elements and controlling said driving circuit, each of said image pickup elements having a non-destructive photosensor in which photocarriers are stored in a base of a bipolar transistor.

7. An image pickup device according to any of claims 1–6, wherein said control circuit supplies a first control signal for turning on or off the illuminating means, and a second control signal for operating a shift register of said image pickup elements.

8. An image pickup device according to any of claims 1–6, wherein said image pickup device further comprises an optical system for illumination.

9. An image pickup device according to any of claims 1–6 wherein a signal for activating said drive circuit for the illuminating means is output from said drive circuit for said light receiving element.

10. An image pickup device according to claim 9, wherein said signal for activating is output in accordance with a timing for a storage operation of said light receiving elements.

11. An image pickup device according to any one of claims 1–6, wherein the illuminating means is a light emitting diode.

12. An image pickup device according to any of claims 1–6, wherein said image pickup device further comprises a focusing optical system.

13. An image pickup device according to claim 1, wherein said image pickup device supplies to said drive circuit a signal for operating the illuminating means only during a term for storing a photocarrier.

14. An image pickup device according to claim 1, wherein said image pickup device turns off the illuminating means during a term for horizontal and vertical scanning of said image pickup elements.

15. An image pickup device according to claim 1, wherein said image pickup device operates said image pickup elements and the illuminating means synchronously.

16. An image pickup device according to claim 1 or any one of claims 3–5, wherein said image pickup elements are of a type storing photocarriers in a base of a bipolar transistor.

* * * * *

UNITED STATES PATENT AND TRADEMARK OFFICE
CERTIFICATE OF CORRECTION

PATENT NO. : 5,714,752

DATED : February 3, 1998

INVENTOR(S): ISAMU UENO ET AL.

It is certified that error appears in the above-identified patent and that said Letters Patent is hereby corrected as shown below:

Title page, item
[56] REFERENCES CITED

```
   Foreign Patent Documents
     "0456451  5/1991  Euro. Pat. Off." should read
     --0456451  11/1991 Euro. Pat. Off.---.
```

COLUMN 8

```
   Line 35, "of" (first occurrence) should be deleted.
```

COLUMN 10

```
   Line 63, "light receiving element." should read
      --image pickup elements.---.
   Line 66, "light receiving" should read --image pickup---.
```

Signed and Sealed this

Twenty-eighth Day of July, 1998

Attest:

BRUCE LEHMAN

*Attesting Officer*   *Commissioner of Patents and Trademarks*